United States Patent Office 3,552,768
Patented Jan. 5, 1971

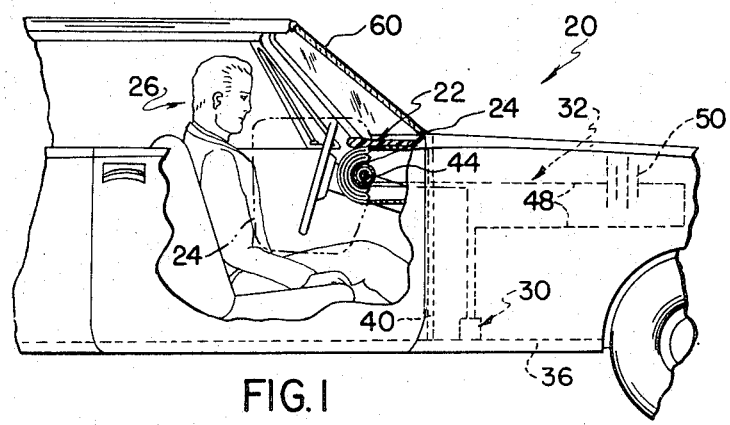

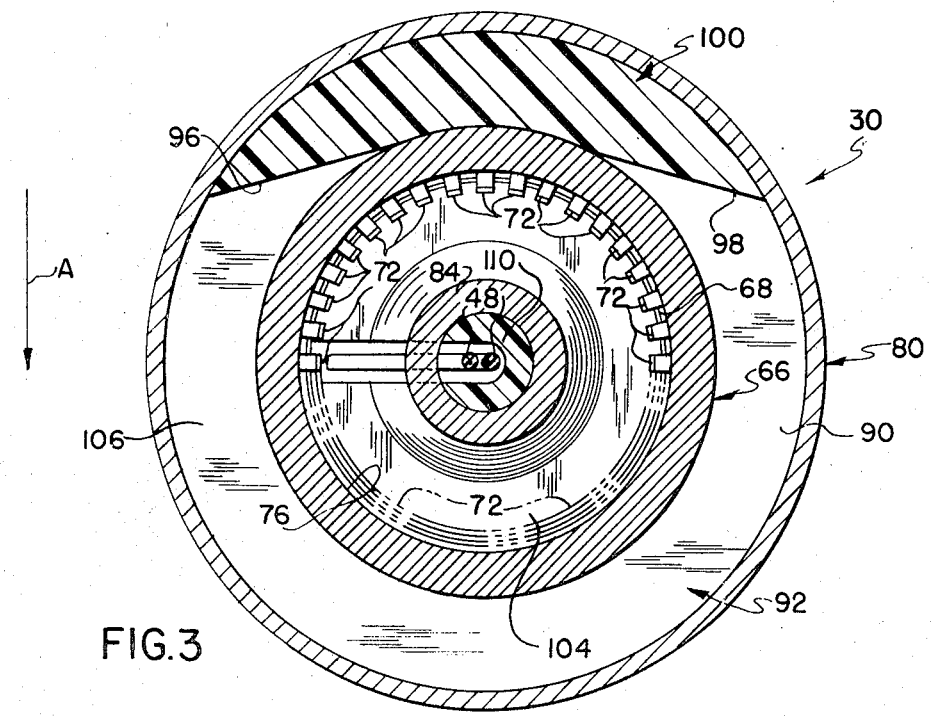
FIG.3
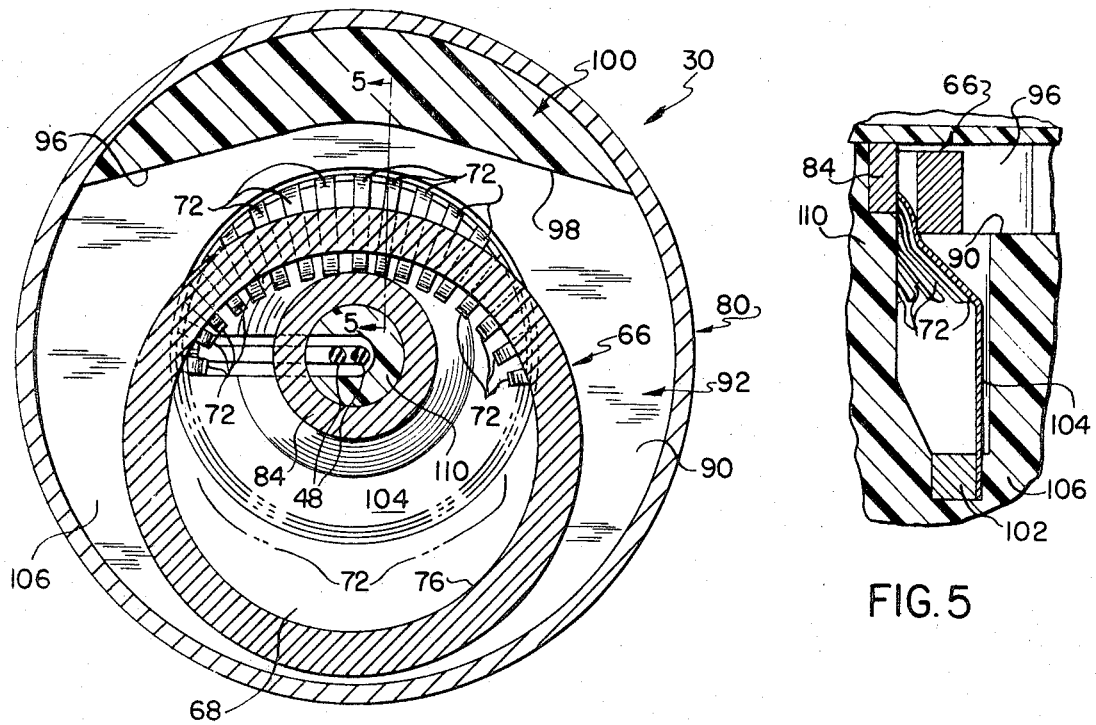
FIG.4
FIG.5

3,552,768
CRASH SENSOR
Hermann Kaiser, Detroit, Mich., assignor to Eaton Yale
& Towne Inc., Cleveland, Ohio, a corporation of Ohio
Filed Aug. 20, 1968, Ser. No. 753,948
Int. Cl. B60r 21/00
U.S. Cl. 280—150                                    12 Claims

ABSTRACT OF THE DISCLOSURE

An improved sensor assembly for actuating a vehicle safety apparatus upon the occurrence of a collision includes an annular mass which is urged against an energy-absorbing stop by a plurality of resiliently yieldable contact fingers with sufficient force to prevent movement of the mass to an actuated position due to vehicle braking and the encountering of normal road conditions. When a collision occurs, the mass moves against the influence of the contact fingers to the actuated position in which the contact fingers engage a circular fixed contact to complete a circuit for effecting operation of the vehicle safety apparatus.

---

This invention relates generally to a sensor assembly for actuating a safety device for protecting an occupant of a vehicle during a collision, and more particularly relates to a sensor assembly having a mass which is biased to an initial position and which moves against the bias to press a movable contact means into engagement with a fixed contact means.

A known safety apparatus includes a confinement which is inflated to restrain movement of an occupant of a vehicle during a collision. Such a safety apparatus is shown in application Ser. No. 562,289, filed July 1, 1966, now Pat. No. 3,414,292 assigned to the assignee of the present invention. When an automotive vehicle with which this safety apparatus is associated is driven along a rough road or hits a hole in a road, the vehicle is subjected to an instantaneous deceleratiton or "g" force which may be of greater magnitude than the deceleration or "g" force encountered in certain collisions. Under such conditions, the inflation of the confinement would be unnecessary and undesirable, since it would tend to startle occupants of the vehicle and might even impair to a limited extent the driver's ability to control the vehicle. Therefore, a sensor assembly for effecting inflation of the confinement upon the occurrence of a collision must be able to discriminate between deceleration due to a collision and deceleration caused by normal braking and road conditions. In addition, the sensor assembly must be constructed so as not to operate due to vibrations which may be induced by normal road conditions.

It has been found that the distinction between deceleration due to road conditions and deceleration due to a collision is not in the magnitude of the deceleration impulse on the vehicle, but rather on the duration thereof. For example, when a vehicle encounters a deep chuck hole in a road, the vehicle may be subjected to a high deceleration for a very short time interval. When the vehicle is involved in a collision, the deceleration may never be as high as when the vehicle hits the chuck hole, but the duration of the deceleration will be much longer. Accordingly, a sensor for actuating a safety device for protecting an occupant during a collision must be able to discriminate between the vehicle encountering a collision and encountering normal road conditions. In addition, it has been discovered that to do so a sensor should be able to distinguish between deceleration or "g" forces of similar magnitude and different duration.

While it is important that a collision sensor assembly be constructed in such a manner as to be responsive to a collision and nonresponsive to road conditions, it is also important that the sensor assembly operate to activate the safety apparatus at the proper instant during a collision. If the safety apparatus is activated too soon after the instant of impact, the confinement may be inflated and then at least partially deflated before the occupant begins to move forwardly relative to the vehicle due to the collision. Conversely, if the safety apparatus is activated too long after the instant of impact, the occupant may be injured by smashing against a part of the vehicle before the confinement is inflated to restrain his movement.

All of the above, has been discussed in copending application Ser. No. 753,946 of George W. Goetz and Hermann Kaiser, assigned to the assignee of the present application. A sensor having the above advantages is claimed therein.

Moreover, it is desirable that a sensor operate in the same manner for a plurality of directions of impact. Since the direction of the impact for collisions will vary considerably, the sensor should operate during all collisions of a predetermined severity or magnitude in approximately the same time.

Accordingly, it is an object of this invention to provide a new and improved collision sensor assembly for effecting actuation of a safety apparatus upon the occurrence of a collision and wherein the collision sensor assembly is constructed to discriminate between deceleration due to a collision and deceleration due to road conditions and also has the same response time for collisions of equal magnitude within a wide range of directions of impact.

Another object of the present invention is the provision of a new and improved collision sensor, as noted in the next preceding paragraph, wherein the sensor includes a mass movable in a plurality of directions with the same response time for collisions of equal magnitude but of different directions of impact.

Another object of the present invention is the provision of a new and improved sensor, as noted above, wherein the sensor moves in all directions against a biasing means which comprises a series of spring fingers which apply a substantially equal biasing force against the mass for all directions of movement thereof.

Still another object of this invention is to provide a new and improved collision sensor assembly which includes an annular mass movable relative to a housing in response to a collision in a manner similar to the movement of an occupant of the vehicle relative to the vehicle in response to a collision to press certain movable contacts into engagement with a fixed contact to activate a safety apparatus immediately before movement of the occupant relative to the vehicle.

Yet another object of this invention is to provide a new and improved vehicle collision sensor assembly having a mass which is movable from an initial condition to an actuated condition in which yieldable contact fingers are pressed against a fixed contact upon vehicle deceleration, the mass being pressed in the initial position against an energy-absorbing stop by the yieldable contact fingers to minimize vibration of the mass due to road conditions and thereby prevent vibration induced actuation of the collision sensor assembly.

These and other objects and features of the present invention will become more apparent upon a consideration of the following description of a preferred embodiment of the present invention taken in connection with the accompanying drawing wherein:

FIG. 1 is a schematic illustration showing a safety apparatus constructed in accordance with the present invention and associated with an automotive vehicle;

FIG. 2 is a schematic illustration, on an enlarged scale of a sensor assembly for detecting the occurrence of a collision and effecting actuation of the safety apparatus from the collapsed condition of FIG. 1 to the expanded condition, shown in dashed lines in FIG. 1;

FIG. 3 is a schematic illustration, taken along the line 3—3 of FIG. 2, further illustrating the structure of the sensor assembly in an initial condition before the occurrence of a collision;

FIG. 4 is a schematic illustration, similar to FIG. 3, depicting the sensor assembly in an actuated condition immediately after a collision; and FIG. 5 is a schematic illustration, taken along the line 5—5 of FIG. 4, further illustrating the structure of the sensor assembly in the actuated condition.

The present invention provides a collision sensor assembly for detecting the occurrence of a collision and effecting actuation of a vehicle safety apparatus to an operated condition to protect an occupant of the vehicle. The collision sensor assembly is operated in response to deceleration resulting from the vehicle encountering a collision. The sensor is capable of distinguishing a collision from vehicle braking, normal road conditions and minor vehicle impacts which will not cause injury to the occupants of the vehicle as described and claimed in copending Goetz and Kaiser application Ser. No. 753,946. The sensor assembly is nonresponsive to the relatively large instantaneous deceleration caused by certain road conditions, even though the magnitude of the instantaneous deceleration may exceed the deceleration at any instant during a collision. To these ends, the collision sensor assembly includes a mass which is biased to an inactive position against an energy-absorbing stop member by a plurality of resiliently yieldable contact fingers. During a collision, the mass moves to an actuated position against the influence of the contact fingers in much the same manner as the occupant of the vehicle moves relative thereto to effect activation of the safety apparatus immediately before the occupant begins to move relative to the vehicle by pressing the resiliently yieldable contact fingers against a fixed contact. Although the vehicle safety apparatus and collision sensor assembly are illustrated in the drawing in particular locations on an automotive vehicle, it is contemplated that the safety apparatus and collision sensor assembly could be mounted in other locations.

Referring to FIG. 1, an automotive vehicle 20 is illustrated schematically and includes a safety apparatus 22. The safety apparatus 22 includes a confinement 24 which is inflated, from a collapsed condition, shown in solid lines in FIG. 1, to an expanded condition, shown in dashed lines in FIG. 1, to restrain movement of an occupant 26 of the vehicle during a collision. A collision sensor assembly 30 is connected with the safety apparatus 22 by electrical circuitry 32 and is operative to detect the occurrence of a collision and effect activation of the safety apparatus 22 from the inoperative position to the operative position. In the present embodiment of the invention, the sensor assembly 30 is mounted on a cross frame member 36 of the vehicle 20. However, it is contemplated that the sensor assembly 30 could, if desired, be mounted on a fire wall 40 or other part of the vehicle 20.

The safety apparatus 22 includes a fluid supply, in the present instance a reservoir 44 containing fluid under pressure. An explosive charge is associated with the reservoir 44, in a known manner, for forming an opening in the reservoir to enable the fluid to escape therefrom upon the occurrence of a collision. The explosive charge is detonated or activated by operation of the collision sensor assembly 30 upon the occurrence of a collision. Operation of the sensor assembly 30 completes a circuit through wires 48 of the circuitry 32 to conduct current from a source of power, such as a battery 50, to effect activation of the explosive charge.

Upon activation of the explosive charge and the formation of an opening in the fluid reservoir 44, fluid flows through the opening in the reservoir to inflate the confinement 24 from the collapsed condition, shown in solid lines in FIG. 1 to the expanded condition, shown in dashed lines in FIG. 1. The confinement 24, in the expanded condition, restrains forward movement of the occupant 26 to prevent him from engaging the windshield 60 or other parts of the vehicle 20 under the influence of collision forces. A pressure responsive blow-out assembly, of known construction, may be provided for forming an aperture in the confinement to minimize rebound of the occupant 26 by enabling fluid to escape from the confinement. This flow of fluid results in the confinement 24 being deflated shortly after the occurrence of the collision.

The collision sensor assembly 30 includes an annular mass 66 (see FIGS. 2, 3) having a circular central opening 68. The mass 66 is restrained against movement from an initial position or condition, shown in FIGS. 2 and 3, to an actuated position or condition, shown in FIGS. 4 and 5, by a plurality of resilient contact fingers 72 which abuttingly engage a circular inner surface 76 of the annular mass 66 when the mass is in the initial or inactive position of FIGS. 2 and 3. The mass 66 is supported in a housing 80 for movement relative thereto. Upon the occurrence of a collision, deceleration of the vehicle 20 and of the housing 80 of the collision sensor assembly 30 results in the mass 66 being moved against the restraining effect of the yieldable contact fingers 72 to move the contact fingers into engagement with an annular fixed contact 84 (see FIGS. 4 and 5) to complete an electrical circuit between the leads 48 (see FIG. 2) and thereby effect operation of the safety apparatus 22.

It should be noted that the contact fingers 72 perform two functions, that is, they act as a plurality of springs which are connected to the housing 80 and extend into the opening 68 in the annular mass 66 to restrain the mass 66 against movement from the initial position of FIG. 3 to the actuated position of FIG. 4. The contact fingers 72 also function to complete an electrical circuit when they are moved into engagement with the central fixed contact ring 84 by movement of the mass 66 relative to the housing 80.

The mass 66 is slidably supported on a generally horizontal surface 90 of a chamber 92 formed in the housing 80. A pair of angularly related stop or side walls 96, 98 are provided in the housing for blocking movement of the mass 66 in a certain direction. In the illustrated embodiment, the walls 96, 98 are part of an upwardly projecting stop section 100 and intersect at an included angle of 120°, i.e., 60° in opposite directions from the forward direction of the vehicle 20, the direction of arrow A FIG. 3, to limit the sideward and rearward movement of the mass 66. Therefor, the mass 66 is subject to sliding movement from the initial position to the actuated position due to collisions which result in forces providing for relative movement of the housing 80 and mass 66 within the included angle between the walls 96, 98. Such collisions, in general would be collisions where the direction of impact is within the included angle between the walls 96, 98. For all collisions where the direction of impact is within the included angle between the walls 96, 98 the time for response, i.e., the time it takes for the contacts to close, would be the same for collisions of equal magnitude. This is due to the fact that the distance the mass 66 moves and the biasing force of the spring fingers would be the same. In a collision wherein the mass 66 tends to move in a sideward or rearward direction relative to the housing 80, one of the walls 96, 98 of the housing 80 prevents such movement. Of course, an included angle of more or less than 120° could be provided between the side walls 96, 98 or a plurality of sensors could be used.

When a vehicle having a sensor 30 becomes involved in a collision, the vehicle decelerates. The deceleration is not at a constant magnitude, but on the contrary, varies. Moreover, as parts of the vehicle crush during the initial stages of a collision, the vehicle could accelerate. The housing 80 of the sensor is attached to a part of the vehicle which decelerates and, possibly, accelerates after impact of the vehicle with an obstruction. The mass 66 being free to move relative to the housing 80 tends to move relative thereto during a collision due to the momentum of the mass 66, and moves relative thereto upon overcoming the restraining effect of the yieldable contact fingers.

In the event of a collision resulting a forces having both forward and sideward components, the mass 66 slides within the chamber 92 of the housing 80 against certain of the contact fingers 72 which may be offset to one side of some of the contact fingers engaged by the mass when it moves forwardly in the manner shown in FIG. 4. Thus, the contact fingers 72 which are moved into engagement with fixed contact 84 vary as a function of the direction of movement of the mass 66 relative to the housing 80. Since the contact fingers 72 are substantially identical in construction and are spaced equal distances from the central fixed contact 84, this results in substantially the same biasing force being applied to the mass 66, although by different contact fingers 72, when the mass moves in a forwardly and sidewardly direction as when the mass 66 moves in a straight forward direction.

When the mass 66 tends to move forward under the influence of collision forces, the inner surface 76 of the mass 66 pivots certain of the contact fingers 72 relative to a base 102 of electrically conductive material from which the fingers 72 project and with which the fingers are formed intergally therewith. The base 102 of electrically conductive material is mounted in a generally cylindrical cavity 104 formed in a body 106 of electrically insulating material. The annular fixed contact ring 84 is mounted on an upstanding projection 110 which is located in a center portion of the cavity 104. It is contemplated that the sensor assembly 30 could be constructed, if desired, with the movable contact fingers located radially outwardly of the mass 66. In such a construction, the mass 66 would move the contact fingers outwardly into engagement with a suitable fixed contact upon the occurrence of a collision.

Upon the occurrence of a head-on collision, which is likely to injure the occupant 26 of the vehicle 20, the mass 66 slides forward relative to the housing 80 upon overcoming the biasing effect of the contact fingers 72. The bias of the contact fingers 72 will be overcome only when the deceleration of the housing 80 is above a predetermined rate for a predetermined time interval. However, if the vehicle 20 encounters conditions where the deceleration of the housing 80 is relatively small or of an insufficient duration to overcome the biasing effect of the contact fingers 72, the mass 66 will not move sufficiently to actuate the safety apparatus 22.

During many minor or low speed collisions or impacts, the collision forces are insufficient to cause injury to an occupant of the vehicle and the safety apparatus 22 need not be operated. Thus, when the vehicle 20 collides with a rigid barrier at a low speed, the collision forces can be readily resisted by the occupant 26 and the average force on the mass 66 is incapable of moving the mass to the actuated position against the influence of the contact fingers 72. Therefore, the mass 66 is not sliding through a sufficient distance to engage the movable contact fingers 72 with the fixed contact 84 and the safety apparatus 22 remains in the inoperative condition shown in solid lines in FIG. 1.

Displacement of the mass 66 increases substantially with an increase in the speed at which the vehicle collides with the barrier. At a predetermined speed, the collision could cause injury to the occupant 26 of the vehicle 20 and the mass 66 slides along the surface 90 to the actuated position, shown in FIG. 4, to press the movable contact fingers into engagement with the central fixed contact 84. This completes the electrical circuit 32 to operate the safety apparatus 22 and protect the occupant 26 of the vehicle 20 during the collision. Thus, the sensor assembly 30 is not actuated by relatively low impact forces resulting from a minor bumping of the vehicle against a barrier since the collision forces are insufficient to cause injury to the occupant 26. However, as the speed of the vehicle increases, the forces resulting from the impact of the vehicle against the barrier increase and, at a predetermined speed, the sensor assembly 30 is actuated to effect operation of the safety apparatus 22 to protect the occupant 26 against the relatively large forces of a collision.

When the vehicle 20 is being driven along a road, it may encounter "chuck" holes or dips and ridges in the road which can subject the vehicle to high instantaneous deceleration, However, the deceleration is at a high frequency, and thus the duration of the deceleration is insufficient to result in injury to the occupant 26 of the vehicle 20. The biasing effect of the contact fingers 72 is such as to retain the mass 66 against movement to the actuated position due to such instantaneous high frequency deceleration. Moreover, the biasing effect of the contact fingers 72 is also such as to retain the mass against movement due to vehicle deceleration as a result of braking. Accordingly, the mass 66 slides through a relatively small distance, when the vehicle 20 is braked or encounters certain road conditions and does not move the contact fingers 72 into engagement with the fixed contact 84.

When the vehicle 20 encounters particularly severe road conditions, the vehicle may be subjected to impact forces which will for an instant, be in excess of the impact forces encountered in many collisions. Such a severe road condition was created by stacking boards to a height of over five inches and driving the vehicle 20 across the boards. The resultant impact forces and vehicle deceleration were of relatively large magnitude and would have caused the mass 66 to move to the actuated position, if maintained for a substantial period of time. However, these large impact forces were instantaneous in nature and of insufficient duration to effect movement of the mass 66 from the initial position to the actuated position. Thus, even when the vehicle 20 encounters extremely severe road conditions resulting in high instantaneous deceleration, the sensor assembly 30 is not actuated. This is because the high deceleration is of insufficient duration, (i.e., high frequency) to overcome the biasing effect of the contact fingers 72 to cause the mass 66 to move from the initial position to the actuated position. The effect of various types of collisions and road conditions on the sensor assembly 30 is similar to that set forth in copending application Ser. No. 753,946, filed by Hermann Kaiser and George Goetz on Aug. 20, 1968 and entitled Collision Sensor.

During a collision, the occupant 26 moves forwardly toward the windshield 60 in much the same manner as in which the mass 66 moves from the initial position of FIGS. 2 and 3 to the operated position of FIGS. 4 and 5. However, during a collision the mass 66 leads or moves before the occupant begins to move to effect operation of the safety apparatus 22. The extent to which the movement of the mass 66 leads the movement of the occupant 26 can be adjusted by varying the biasing force with which the contact fingers 72 press the mass 66 into engagement with the stop section or member 100. As disclosed and claimed in application Ser. No. 753,946, a biasing force of between 2 and 16 times the weight of the mass 66 results in response characteristics similar to that of the occupant 26. The biasing force of the contact fingers 72 also serves to hold the mass in the initial position so that it is not affected by relatively large instantaneous forces when the vehicle 20 is braked or encounters severe road conditions to thereby prevent unwanted actuation of the safety apparatus 22 to the operated condition. To provide for this limited response to high frequency or short duration forces, the contact fingers 72 have a spring constant of from 5 to 30 times $10^{-3}$ pounds per inch and the contact fingers 72 and mass 66 have a natural frequency, without the stop member 100, of from 2 to 6 cycles per second.

Although the stop member 100 is provided in the preferred embodiment of the invention to prevent movement of the mass 66 in certain directions, the stop member may be omitted. Omission of the stop member 100 results in the mass 66 cooperating with the contact fingers 72 to form a true seismic mass system which would be responsive to forces in all directions. It has been determined that the use of the stop member 100 is particularly advantageous when the sensor assembly 30 is used in asociation with a vehicle to prevent unwanted actuation of the sensor assembly by vibrations of a particular frequency.

Actuation of the sensor assembly 30 causes the confinement 24 to be rapidly inflated to the operative or expanded condition, shown in dashed lines in FIG. 1. In the expanded condition, the confinement 24 restrains movement of the occupant 26 relative to the vehicle to thereby protect the occupant. The operation of a known blow-out assembly associated with the confinement results in a deflation and a collapsing of the confinement 24 a short time after it is inflated to the expanded condition to minimize rebound of the occupant 26 relative to the confinement. Thus, it is important that the mass 66 moves in a manner which is analogous to the movement of the occupant 26 so that the mass 66 moves to the actuated position just before the occupant 26 begins to move forwardly. If the mass responds too quickly to the collision forces and the confinement is inflated too soon, the confinement may be deflated before the occupant 26 begins his forward movement. The safety apparatus 22 is then ineffective to protect the occupant. Of course, if the mass 66 responds too slowly and the confinement is inflated too late, the occupant 26 may be injured by engagement with the vehicle before the confinement is inflated.

A proper relationship of the mass, spring, and distance of movement of the mass are necessary to enable the sensor assembly 30 to discriminate between the various road conditions encountered by a vehicle and a collision, as disclosed in application Ser. No. 753,946. The movable contact fingers 72 are moved through a distance of from .1 of an inch and 1 inch when they are moved by the mass 66 into engagement with the fixed contact 84. During this movement, the contact fingers 72 exert a substantially constant biasing force, of from 2 to 16 times the weight of the mass, resisting inward movement of the contact fingers. If the distance through which the mass is moved from the initial position to the actuated position is less than .1 of an inch, the mass may be displaced to the actuated condition by severe road conditions causing an instantaneous high deceleration, even though the vehicle 20 has not encountered a collision. If the distance through which the mass 66 is displaced from the initial position to the actuated position is more than 1.0 inch, the time required for the mass to travel the distance will be too great. If the biasing force of the spring against the mass is low, the mass may move under the influence of vibrations resulting from road conditions or braking. Of course, too high a biasing force would prevent operation of the sensor assembly during certain collisions.

In addition to the influence of the contact fingers 72, the mass 66 is prevented from moving toward the actuated position under the influence of vibrations from road conditions by the stop member 100 which is formed of an energy-absorbing material having a coefficient of restitution which is less than 0.3. If the stop member 100 was formed of a material having a relatively high coefficient of restitution, for example, a coefficient of restitution in excess of 0.9, the rebound of the mass from the stop member 100 and vibration of the mass relative to the stop member could result in the mass being moved to the actuated position, even though the vehicle did not encounter a collision.

In view of the foregoing, it can be seen that the collision sensor assembly 30 has a mass 66 which moves to an actuated position to effect actuation of the safety apparatus 22. The mass 66 is held against the energy-absorbing stop 100 by the resiliently yieldable contact fingers 72 which restrain the mass against moving to the actuated position under the influence of forces and vibrations resulting from normal road and braking conditions. The mass 66 moves from the initial position to the actuated position against the influence of the contact fingers 72 as a function of the duration and magnitude of the average deceleration of the housing 80 over the elapsed time interval from the occurrence of the collision. Therefore, the mass 66 is nonresponsive to relatively high rates of deceleration of short duration (i.e., high frequency) similar to that associated with severe road conditions. Of course, if the vehicle 20 was subject to the high rate of deceleration for a longer time period, the mass 66 would be moved to the actuated position to effect operation of the safety apparatus 22 to protect the occupant 26.

Since the mass 60 moves relative to the housing 80 in different types of collisions in much the same manner as the occupant 26 moves relative to the vehicle, the sensor assembly 30 is effective to initiate operation of the safety apparatus 22 at the proper time during a collision. Upon the occurrence of any type of collision resulting in the application of forces of sufficient magnitude and duration in the forward direction, the mass 66 moves forwardly relative to the housing 80 to press the contact fingers 72 into engagement with the fixed contact 84 to complete a circuit and effect inflation of the confinement 24 immediately before the occupant 26 begins to move forwardly under the influence of the collision forces. This ensures that the confinement is inflated in time to protect the occupant and ensures that the confinement 24 is not deflated before the effect of the collision forces on the occupant 26 are at least partially overcome by penetration or engagement of the occupant 26 with the confinement. Of course, the sensor assembly 20 and safety apparatus 22 could, if desired, be located in orientations other than the one illustrated herein to protect an occupant of a vehicle against collision forces tending to move him in a direction other than the forward direction.

Having described my invention, I claim:

1. A collision sensor assembly for use in actuating a safety device on a vehicle to protect an occupant of the vehicle during a collision, said collision sensor comprising a housing having a support surface, a mass slidably mounted on said support surface, a plurality of yieldable contact fingers extending adjacent said mass, and fixed contact means uniformly spaced from each of said contact fingers, said mass being movable from an initial position to an actuated position in which certain of said contact fingers engage said fixed contact means upon the occurrence of a collision to effect operation of the safety device, said contact fingers being resilient and located in abutting engagement with said mass and yieldably restraining movement of said mass from said initial position to said actuated position to prevent said collision sensor from being operated by road conditions and braking of the vehicle.

2. A collision sensor as set forth in claim 1 wherein said mass has a generally annular configuration and said fixed contact means is located in a central opening in said annular mass, said contact fingers being located between said fixed contact means and a surface of said mass defining the opening.

3. A collision sensor as set forth in claim 1 wherein said mass and yieldable contact fingers comprise a spring mass seismatic system having a natural frequency of from 2 to 6 cycles per second.

4. A collision sensor as set forth in claim 1 further including an energy absorbing stop means having a surface against which said mass is urged by said resilient fingers.

5. A collision sensor as set forth in claim 4 wherein said resilient fingers apply a biasing force of from 2 to 16 times the weight of the mass and the distance between said fixed contact means and said contact fingers is uniform and between .1 of an inch and 1 inch.

6. Apparatus comprising a safety device operable to protect an occupant of a vehicle during a collision, said safety device comprising an inflatable confinement for restraining movement of the occupant during a collision, a collision sensor for actuating the confinement, said sensor comprising a housing adapted to be secured to a part of the vehicle, fixed contact means located within said housing, movable contact means mounted in said housing and spaced from said fixed contact means by a distance of no less than .1 of an inch and no more than 1 inch, a mass movable within said housing from an initial position upon the occurrence of a collision to an actuated position in which said mass presses said movable contact means into engagement with said fixed contact means to effect operation of the safety device, spring means urging said mass against movement from said initial position to said actuated position, with a biasing force of from 2 to 16 times the weight of said mass to retard movement of said mass from said initial position to said actuated position under the influence of vibration and deceleration resulting from road conditions and braking, and energy absorbing stop means against which said mass is urged by said spring means and engageable with said mass when said mass is in said initial position.

7. A collision sensor for use in actuating a safety device on a vehicle to protect an occupant of the vehicle during a collision, said sensor comprising a housing adapted to be secured to a part of the vehicle, fixed contact means located within said housing, movable contact means mounted in said housing and spaced from said fixed contact means by a distance of no less than .1 of an inch and no more than 1 inch, a mass movable within said housing from an initial position upon the occurrence of a collision to an actuated position in which said mass presses said movable contact means into engagement with said fixed contact means to effect operation of the safety device, said mass including a surface thereon, said fixed and movable contact means being located adjacent said surface, said movable contact means being movable into engagement with said fixed contact means by said surface of said mass when said mass moves from said initial position to said actuated position, spring means urging said mass against movement from said initial position to said actuated position with a biasing force of from 2 to 16 times the weight of said mass to retard movement of said mass from said initial position to said actuated position under the influence of vibration and deceleration resulting from road conditions and braking, and energy-absorbing stop means against which said mass is urged by said spring means when said mass is in said initial position.

8. A collision sensor for use in actuating a safety device on a vehicle to protect an occupant of the vehicle during a collision, said sensor comprising a housing adapted to be secured to a part of the vehicle, fixed contact means located within said housing, movable contact means mounted in said housing and spaced from said fixed contact means by a distance of no less than .1 of an inch and no more than 1 inch, a mass movable within said housing from an initial position upon the occurrence of a collision to an actuated position in which said mass presses said movable contact means into engagement with said fixed contact means to effect operation of the safety device, spring means urging said mass against movement from said initial position to said actuated position with a biasing force of from 2 to 16 times the weight of said mass to retard movement of said mass from said initial position to said actuated position under the influence of vibration and deceleration resulting from road conditions and braking, said spring means including a plurality of yieldable fingers located within said housing, said mass being slidable along a support surface extending transversely to said yieldable fingers between said initial and actuated positions with certain of said yieldable fingers being deflected by movement of said mass from said initial position to said actuated position to bring said movable contact means into engagement with said fixed contact means, and energy-absorbing stop means against which said mass is urged by said spring means when said mass is in said initial position.

9. A collision sensor for use in actuating a safety device on a vehicle to protect an occupant of the vehicle during a collision, said sensor comprising a housing adapted to be secured to a part of the vehicle, fixed contact means located within said housing, movable contact means mounted in said housing and spaced from said fixed contact means by a distance of no less than .1 of an inch and no more than 1 inch, a mass movable within said housing from an initial position upon the occurrence of a collision to an actuated position in which said mass presses said movable contact means into engagement with said fixed contact means to effect operation of the safety device, spring means urging said mass against movement from said initial posiiton to said actuated position with a biasing force of from 2 to 16 times the weight of said mass to retard movement of said mass from said initial position to said actuated position under the influence of vibration and deceleration resulting from road conditions and braking, said mass including a surface defining a central opening therein, said fixed contact means having a surface generally similar in configuration to the configuration of said surface of said mass, said spring means including a plurality of yieldable fingers which have one portion abutting said surface of said mass and another portion forming said movable contact means, certain of said fingers being deflected by movement of said mass to said actuated position to thereby bring said movable contact means into engagement with said fixed contact means, and energy-absorbing stop means against which said mass is urged by said spring means when said mass is in said initial position.

10. A collision sensor for use in actuating a safety device on a vehicle to protect an occupant of the vehicle during a collision, said sensor comprising a housing adapted to be secured to a part of the vehicle, fixed contact means located within said housing, movable contact means mounted in said housing and spaced from said fixed contact means by a distance of no less than .1 of an inch and no more than 1 inch, a mass movable in a plurality of directions within said housing from an initial position upon the occurrence of a collision to an actuated position in which said mass presses said movable contact means into engagement with said fixed contact means to effect operation of the safety device, spring means urging said mass against movement from said initial position to said actuated position with a biasing force of from 2 to 16 times the weight of said mass to retard movement of said mass from said initial position to said actuated position under the influence of vibration and deceleration resulting from road conditions and braking, said biasing force exerted by said spring means against movement of said mass being substantially uniform in each of said plurality of directions, said movable contact means being located substantially the same distance from said fixed contact means as measured in each of the plurality of directions so that the response of said sensor assembly to collisions of substantially the same severity in each of said plurality of directions is substantially the same, and energy-absorbing stop means against which said mass is urged by said spring means when said mass is in said initial position.

11. Apparatus comprising a safety device operable to protect an occupant of a vehicle during a collision, said safety device comprising an expandable confinement having a collapsed condition and an expanded condition for restraining movement of an occupant during a collision, means for expanding said confinement upon the occurrence of a collision, and a collision sensor for sensing a collision and operating said means for expanding said confinement, said collision sensor comprising a housing adapted to be secured to a part of the vehicle which is subjected to a change in acceleration during a collision, a mass supported in said housing and movable relative thereto from an initial position to an actuated position upon the occurrence of a collision, spring means for biasing said mass toward said initial position and retaining said mass against movement to said actuated position due to vehicle braking and during vibration thereof resulting from road conditions, said spring means including movable contact means located in said housing and movable with said mass upon movement thereof, an energy absorbing stop against which said mass is biased by said spring means and which absorbs energy upon engagement with said mass for preventing a vibration induced actuation of said sensor, fixed contact means located in said housing and spaced away from said movable contact means when said mass is in said initial condition, said fixed contact means being disposed so that movement of said mass to said actuated position effects engagement of said movable contact means with said fixed contact means.

12. A collision sensor assembly for use in actuating a vehicle to protect an occupant of the vehicle during a collision, said collision sensor comprising a housing adapted to be secured to a part of the vehicle which is subjected to a change in acceleration during a collision, a mass supported in said housing and movable relative thereto in any one of a plurality of directions from an initial position to any one of a plurality of actuated positions under the influence of collision forces, spring means for biasing said mass toward said initial position and retaining said mass against movement to the actuated positions due to vehicle braking and during vibration thereof resulting from road conditions, movable contact means located in said housing and movable in response to movement of said mass, an energy absorbing stop against which said mass is biased by said spring means when said mass is in the initial position and which absorbs energy upon engagement with said mass for preventing a vibration induced actuation of said sensor, second contact means located in said housing and spaced away from said movable contact means when said mass is in said initial condition, said second contact means being disposed so that movement of said mass to any one of the plurality of actuated positons effects engagement of said movable contact means with said second contact means.

References Cited
UNITED STATES PATENTS

| | | | |
|---|---|---|---|
| 2,741,674 | 4/1956 | Richard | 200—61.45 |
| 2,850,291 | 9/1958 | Ziccardi | 280—150 |
| 2,982,829 | 5/1961 | McCabe et al. | 200—61.45X |
| 2,984,719 | 5/1961 | Higgs et al. | 200—61.45X |
| 3,001,039 | 9/1961 | Johnson | 200—61.51X |
| 3,031,545 | 4/1962 | Waller | 200—61.45 |
| 3,089,007 | 5/1963 | Rovin | 200—61.48 |
| 3,336,045 | 8/1967 | Kobori | 200—150 |

KENNETH H. BETTS, Primary Examiner

U.S. Cl. X.R.

180—103; 200—61.45